Jan. 18, 1927.
E. F. PIERCE
1,614,688
WINDSHIELD CLEANER
Filed Feb. 9, 1922    2 Sheets-Sheet 1
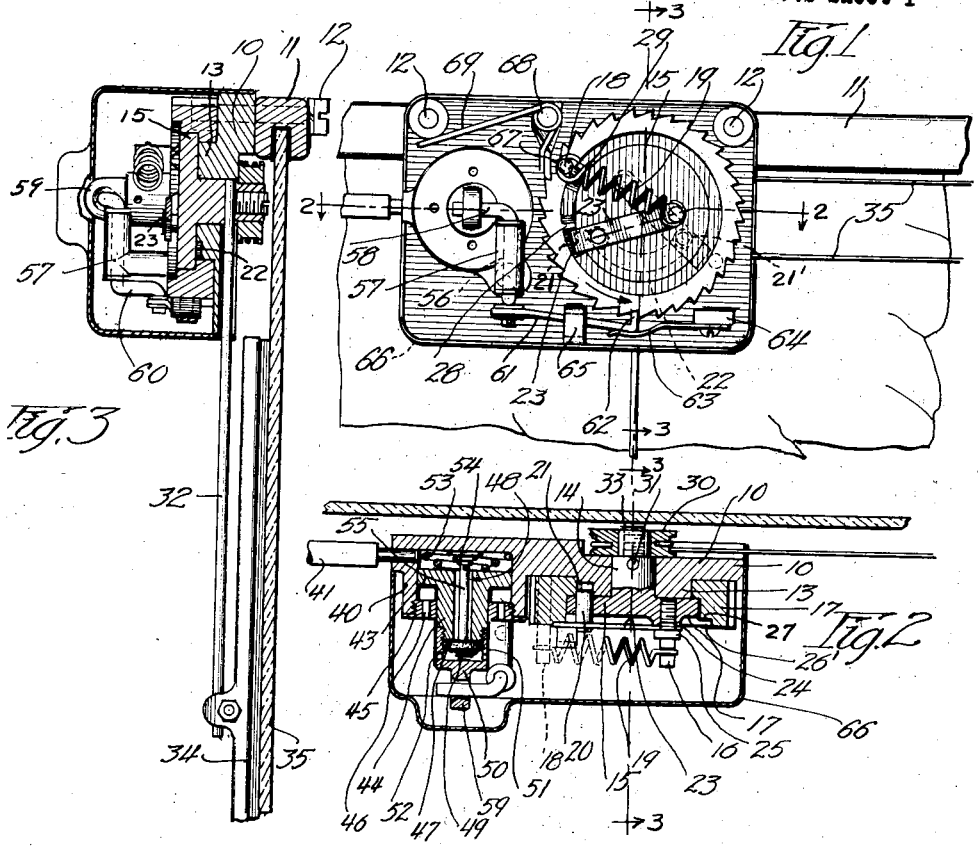
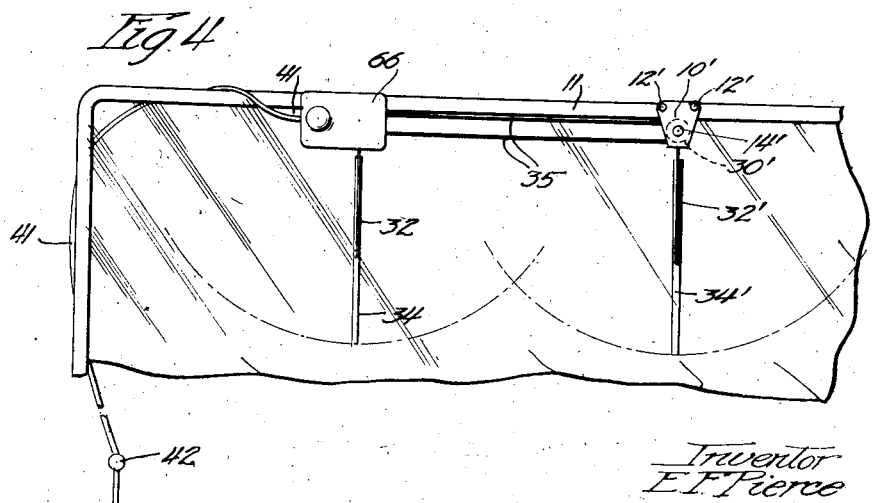
Inventor
E. F. Pierce Jan. 18, 1927.  1,614,688
E. F. PIERCE
WINDSHIELD CLEANER
Filed Feb. 9, 1922   2 Sheets-Sheet 2
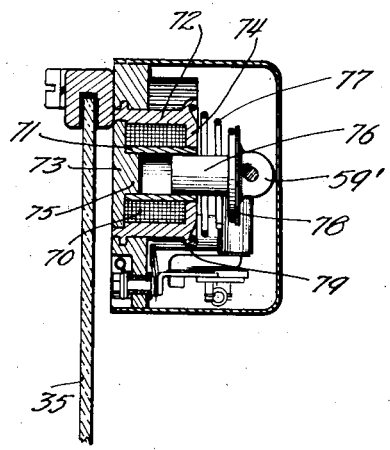
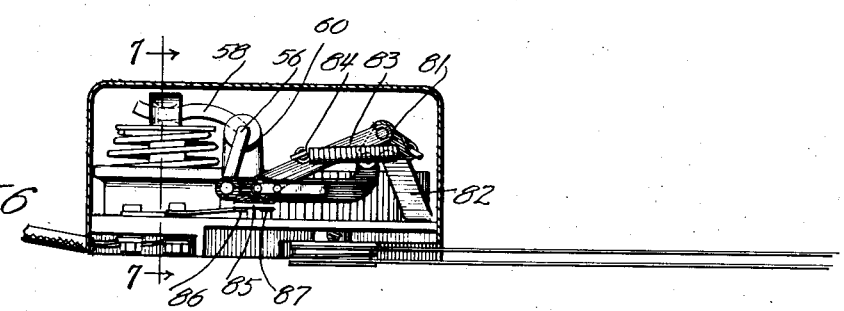
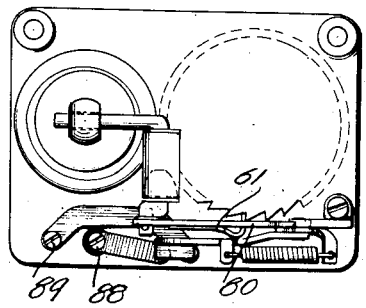
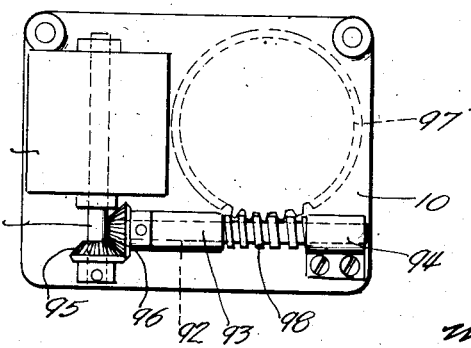

Patented Jan. 18, 1927.

1,614,688

UNITED STATES PATENT OFFICE.

EARL F. PIERCE, OF CHICAGO, ILLINOIS, ASSIGNOR, BY MESNE ASSIGNMENTS, TO TRICO PRODUCTS CORPORATION, OF BUFFALO, NEW YORK, A CORPORATION OF NEW YORK.

WINDSHIELD CLEANER.

Application filed February 9, 1922. Serial No. 535,368.

My invention relates to improvements in windshield cleaners, and is particularly concerned with, though not limited to, windshield cleaners of the type which is operated by a motor.

The objects of my invention are,

First, to provide a motor operated windshield cleaner comprising a wiper arm, a motor, and connections between said wiper arm and motor of such character that the speed of the wiper arm is independent of the speed of the motor;

Second, to provide a windshield cleaner of the character described in which the speed of the motor can be varied, thus varying the number of strokes of the wiper arm at a given period of time but not changing the speed at which said wiper arm operates;

Third, to provide a motor driven windshield cleaner comprising a wiper arm, a motor, and driving connections between the wiper arm and motor comprising a spring adapted to be tensioned by said motor over a given period of time, and means for causing the tension of the spring thus tensioned to be used in causing a movement of the wiper arm through a predetermined distance in a smaller period of time;

Fourth, to provide a windshield cleaner comprising a motor, the power of which is less than the power required for operating the cleaner element;

Fifth, to provide a windshield cleaner comprising a single power plant and a plurality of cleaner elements operated by the single power plant;

Sixth, to provide a windshield cleaner comprising a power plant mounted upon one support, and a cleaner element movably mounted upon another support, there being driving connections between the power plant and the cleaner element, and Seventh, to provide a windshield cleaner which is compact, efficient, rugged, and economical to manufacture.

Other objects will appear as this description progresses, reference being had to the accompanying drawings, in which Figure 1 is a front elevation of a windshield provided with my improved windshield cleaner which is shown in plan view, the top of the housing or casing being broken away for the purpose of better illustration;

Figure 2 is a longitudinal section taken on the line 2—2 of Figure 1;

Figure 3 is a transverse elevation taken on line 3—3 of Figures 1 and 2;

Figure 4 is a view similar to Figure 1 but upon reduced scale, and showing two wiper arms operated by the same power plant;

Figure 5 is a plan view of a modified form of my invention adapted to be electrically operated;

Figure 6 is a side elevation thereof with portions of the housing broken away;

Figure 7 is a transverse section taken on line 7—7 of Figure 6, and

Figure 8 is a plan view of a still further different embodiment of my invention, the cover having been removed.

Throughout the several views, similar reference characters will be used for referring to similar parts, and the several sections are taken looking in the direction of the small arrows.

Referring for the present to Figures 1 to 4 inclusive, my improved windshield cleaner comprises a base plate 10, which is adapted to be secured to the frame 11 of the windshield by means of screws 12, or in any other suitable manner. Adjacent one end of the base plate 10 a low boss 13 projects outwardly from the base plate. A bore extends through the base plate and boss 13. The shaft 14 is journaled in the bore just referred to and has secured to its outer end the crank disc 15 from which the eccentric pin 16 projects outwardly.

An annular ratchet gear 17 is journaled upon the boss 13 and is held upon the boss by a portion of the crank disk 15 which overhangs the boss, as shown in Figure 2. A pin 18 projects outwardly from the annular gear. The outer ends of the pin 18 and eccentric pin 16 are connected by a tension spring 19, which, in Figures 1, 2 and 3, is shown in substantially its completely extended position.

With the spring tensioned, as shown in Figure 1, there is, of course, a movement developed which tends to rotate the disc 15 and its attached shaft 14 about their common axis. To prevent such rotation and to hold these elements against rotation while the spring 15 is being placed under tension, I provide the locking and releasing pin 20 which extends through a suitable opening in the crank disc 15 and into a corresponding opening 21 formed in the edge of the boss 13 (see Figure 2). The inner end of the pin 20 projects into the opening 21 but a very slight distance. The edge of the boss 13 is cut away to provide, between it and the adjacent wall of the annular gear 17, a groove 22 which is slightly less in depth than the opening 21, and which ends in another opening 21' similar to the opening 21. The function of this opening will presently be explained.

A leaf spring 23 has one end confined between the projecting boss 24 of the crank disc and the collar 25 on the pin 16. The other end of the spring projects outwardly beyond the periphery of the crank disc and, as shown at 26, the pin 20 is secured to the leaf spring 23 at a point adjacent its outer end and tends to push the pin 20 inwardly. The inner edge of the annular gear 17 is cut away to provide an annular shoulder 26' which is substantially on a level with the face of the crank disc 15, and from this shoulder project the two cams 28 and 29. These cams slope somewhat gradually in the direction of rotation of the annular gear 17, which is indicated by the arrow in Figure 1, and somewhat more abruptly in the opposite direction.

A pulley 30 is secured to the inner end of the shaft 14 in any suitable manner. The inner end of the shaft 14 is provided with an opening 31 adjacent its inner end in which the inner end of the wiper arm 32 is secured by means of a set screw 33.

Referring to the construction thus far described, it will be clear that if the annular gear 17 is rotated in a counter-clockwise direction, as indicated in Figure 1, the cam 28 will raise the outer end of the spring 23, thereby releasing the inner end of the pin 20 from the opening 21, and will permit the crank disc 15, the shaft 14, and the wiper arm 32 to rotate under the tension of the spring 19. This rotation is accomplished in a comparatively short period of time, and causes the cleaner element 34, which is secured to the outer end of the wiper arm 32, to travel over the face of the windshield 35 and clean the same. The cleaner element 34 can be constructed in the usual manner from a channel shaped piece of metal and the usual squeegee strip. The parts just described are so proportioned in design that the tension of the spring will pull the crank disc around to such position that the pin 20, under the influence of the leaf spring 23, will, after moving through the arc defined by the groove 22 upon the bottom of which the pin 20 slides, drop into the opening 21' and again lock the crank disc 15 and its connected parts against rotation.

In this position of the crank disc, the pin 16 will have traveled through an arc equal to the angle of rotation of the crank disc 15, and will now lie upon the opposite side of a vertical diameter passing through the center of the disc, in Figure 1, a distance substantially equal to the distance that is shown to the right of this diameter in Figure 1. The annular gear 17, continuing to rotate, will soon reach a point where the spring 19 begins to again be placed under tension, and will continue to rotate until the pin 18 reaches a position substantially directly opposite, in a horizontal direction, the position which it now occupies, at which time the cam 29 will move under the projecting end 26 of the leaf spring 23 and release the pin 20 from the opening 21' whereupon the tension of the spring 19 will cause the crank disc 15 and its associated parts to rotate in a direction opposite to its previous rotation until the pin 20 again snaps into the opening 21, thereby again locking the disc 15 against rotation.

As long as the annular gear 17 continues to rotate in the direction of the arrow in Figure 1, it will be clear that the disc 15 and its associated parts will be rotated, first in one direction, and then in the other, and that the time required for rotation in either direction will depend solely upon the tension of the spring 19, it being assumed that the resistance to the movement of the wiper arm 32 remains substantially constant, and that this speed of rotation will in no wise be dependent upon the speed of the annular gear 17. It is true that the number of strokes of the wiper arm during a given interval of time will be dependent upon the speed of rotation of the annular gear 17, but, as stated above, the time required for such stroke or strokes will remain constant, irrespective of the speed of the gear 17.

This feature of my invention is, in comparison with the operation of the motor driven windshield cleaners now appearing on the market, of considerable importance, for in the operation of these latter devices, if an attempt is made to decrease the number of strokes of the wiper arm during a given period of time, the speed of the wiper arm will be correspondingly decreased. With my construction, the speed of the wiper arm can be made anything desired, depending, as it does, upon the tension of the spring 19, and it will remain constant, independent of the speed of the motor. This is desirable because a slowly moving wiper arm obscures, for a certain period of time, the driver's field of vision. With a rapidly moving wiper arm, this objection does not exist.

One objection to the pivoted type of cleaner heretofore in use is that the field of vision which is provided is so small that the driver is unable to see vehicles entering his street from side streets located upon the opposite side of the car from the driver. To overcome this difficulty, it has heretofore been proposed to provide various types of cleaners in which the wiper element traversed the entire length of the windshield, either vertically or horizontally, but these devices have been unsatisfactory on account of the exceedingly long travel of the wiper element. Furthermore, with the type of pivoted cleaner at present in use, it is impracticable to operate more than one cleaner, because with this type of cleaner the motor must supply at any instant all the power required at that instant for operating the wiper element. This means that if an attempt should be made to operate two pivoted cleaners at the same time, the motors of the present type would have to be substantially twice as large as they now are, and positioned as they are upon the windshield, they would seriously obstruct the field of vision of the driver. With my construction, the energy of the motor is accumulated during a protracted period of time which makes it possible to use two pivoted cleaners without requiring a motor of excessive dimensions.

In my present construction, I have shown a second wiper arm 32' which is secured to the inner end of a shaft 14' carried by a suitable bracket or support 10', which is secured to the frame 11 of the windshield by screws 12'. The pulley 30', similar to the pulley 30, is mounted upon the shaft 14' and secured thereto. A squeegee element 34', similar to 34, is secured to the outer end of the wiper arm 32'. For the purpose of communicating movement from the pulley 30 to the pulley 30' and its associated wiper arm 32' and squeegee element 34', I provide the two flexible elements 35. The ends of these elements are anchored to the respective pulleys by being inserted in suitable radial bores in the pulleys, as shown in Figure 2. With the above construction, it will be apparent that the wiper arm 32' will oscillate in unison with the wiper arm 32. The two wiper arms may be so positioned that their arcs will overlap, as shown in Figure 4, or the support 10' may be located so far from the base plate carrying the wiper arm 32 that each wiper arm will provide a separate field of vision, one at one side of the windshield, and the other at the other side.

I shall now describe the motor by which I propose to actuate the above described mechanism.

A cylinder 40 is formed integral with and projects from the same side of the base plate 10 as the boss 13. A pipe 41 connects the inner end of the cylinder 40 with a suitable source of suction, such, for instance, as the manifold of the internal combustion engine driving vehicle, there preferably being provided a valve 42 for controlling the suction to the cylinder 40. The valve 42 is preferably located upon the dash of the vehicle, or in any other position easily accessible to the driver. The piston 43 is slidably mounted in the cylinder 40 and is provided with a hollow piston rod 44 which extends outwardly through the cylinder head 45. This head is provided with a plurality of spaced apertures 46 to provide free access of air to the outer face of the piston. A valve 47 closes the outer end of the bore 48 of the piston rod 44 and is yieldingly held in its closed position by means of the spring 49 which is confined between the outer face of the valve 47 and the end 50 of the cap 51, which is secured to the outer end of the piston rod 44. The cap 51 is provided adjacent its outer end with a plurality of apertures 52 which extend through its walls to permit atmospheric pressure to be exerted on the outer face of the valve 47. A spiral spring 53 tends to force the piston 43 outwardly in the cylinder, and a second spiral spring 54 is secured to the inner end of the valve stem 55 and abuts against the adjacent wall of the cylinder 40. The spring 54 has somewhat greater tension than the spring 49.

A shaft 56 is mounted in a suitable bearing 57 which projects outwardly from the base plate 10. One end of the shaft is provided with a lever arm 58 which projects loosely through the eye 59 of the cap 51, and at its opposite end is provided with a second arm 60 to which is secured one end of the ratchet pawl 61. The opposite end of this pawl is turned inwardly, as shown at 62, to engage the teeth of the annular ratchet gear 17 and is held in engagement with such teeth by means of a leaf spring 63 secured to a post 64 projecting outwardly from the base plate 10. A guide 65 projecting inwardly from one side of the housing 66 holds the inner end of the pawl 61 in registry with the teeth of the ratchet gear. A second pawl 67, pivoted upon the post 68, is held in contact with the ratchet gear by means of a spring 69 and prevents reverse rotation of the ratchet gear 17.

From the above description, it will be noted that when the piston 43 reciprocates in the cylinder 40, its movement will be communicated through the shaft 56, the two arms 58 and 60, and the pawl 61 to the ratchet gear 17, which will be caused to rotate continuously in the direction of the arrow in Figure 1.

The operation of the motor itself is as follows:

When suction is communicated to the cylinder through the pipe 41, atmospheric pressure exerted upon the outer face of the piston 43 and the outer end of the piston rod will cause the piston 43 to move inwardly against the tension of the spring 53. Atmospheric pressure exerted upon the outer face of the valve 47 will hold it closed until the increasing tension of the spring 54 becomes great enough to overcome this pressure and the pressure of the spring 49, whereupon the valve 47 will be opened, thereby balancing the atmospheric pressures upon both sides of this valve, and causing it to move away from the adjacent end of the piston rod under the tension of the spring 54. The bore 48 is made large enough to quickly relieve the pressure in the cylinder 40, whereupon the spring 53 will cause the piston to move outwardly, thereby relieving the tension of both the spring 53 and the spring 54. The piston will move outwardly until the tension of the spring 54 becomes practically nothing, and the spring 49 can then seat the valve 47 upon the end of the piston rod 44, whereupon the suction of the pipe 41 will again reduce the pressure in the cylinder 40 and cause the piston to again move inwardly. This cycle is repeated in rapid succession, and causes the annular gear 17 to move around continuously under the rapid impulses imparted to it by the pawl 61. It will of course, be clear that by restricting the suction in pipe 41 by means of the valve 42, the rate of vibration of the piston 43, and consequently the rate of travel of the annular gear 17, can be controlled, as desired. This, as explained above, will lessen the number of strokes of the wiper arm or arms during a given period, but will in no way affect the speed of these arms during their working strokes.

In Figures 5, 6 and 7, I have illustrated a modified form of my invention in which the suction actuated motor of Figures 1 to 4 inclusive is replaced by an electric motor, the remaining portions of the apparatus remaining substantially the same as in Figures 1 to 4 inclusive.

This electric motor comprises a suitable solenoid 70 wrapped around a tube 71 of non-magnetic material and encased in a cylindrical iron housing 72 having the removable iron end closure 73 and an integral iron end closure 74. The end closure 73 is provided with an inwardly extending boss 75 to increase the pull on the iron plunger 76 which is provided at its outer end with an eye 59′, corresponding to the eye 59 of the modification previously described. A spiral spring 77 interposed between a flange 78 extending from the outer end of the plunger 76 and a flange 79 projecting from the cylindrical housing 72 provides means for returning the plunger 76 to the position shown in Figure 7.

From the above description, it will be clear that if the solenoid 70 is periodically supplied with current, the plunger 76 will first move into the solenoid under the influence of the magnetic field developed thereby, and then, when the supply of current to the solenoid is interrupted, will move outwardly under the influence of the spring 77.

The reciprocation of the plunger 76 will be communicated to the ratchet wheel 17 through the shaft 56, arm 58, arm 60, and the pawl 61, just as in the prior modification. In the present case, however, the pawl 61 is not connected directly to the arm 60 but to a bar 80, one end of which is pivotally secured to the outer end of the arm 60, and the other end of which is pivotally secured to one arm of the bell crank lever 81, which in turn is pivotally mounted upon a bracket 82 projecting upwardly from the base 10. A contact arm 83 is also pivotally mounted upon the outer end of the bracket 82 and a tension spring 84 connects the other end of the bell crank lever 81 with an intermediate part of the contact arm 83, as shown in Figures 6 and 7. The free end of the contact arm 83 is provided with a contact 85 which bridges the two contacts 86 and 87 connected respectively with the binding posts 88 and 89.

From the above description, it will be clear that as the plunger 76 moves into the solenoid, this movement will be communicated to the bar 80, which will move in a direction to cause not only the annular gear 17 to rotate in a counter-clockwise direction, but to also cause the bell crank lever 81 to rotate in a counter-clockwise direction, and that a point will be reached where the point of connection between the spring 84 and the bell crank lever 81 lies above a line passing through the point of connection of the opposite end of the spring 84 with the lever 83 and the center of the pivot point of the lever 83. While the bell crank lever is moving into this position, the spring 84 is being placed under tension, and when it reaches the position just described, the tension of the spring will cause the lever 83 to rotate in a clock-wise direction, thus lifting the bridging contact 85 from the two contacts 86 and 87, which are connected in series with the solenoid 70. The circuit of this solenoid is thus interrupted, the solenoid is de-energized, and the spring 77′ returns the plunger 76 to the position shown in Figure 7. At the same time the bar 80 is retracted, thus causing the bell crank lever 81 to move in a clockwise direction, thus again placing the spring 83 under tension. As soon as the point of connection between the spring 83 and the bell crank lever 81 passes to the opposite side of the line connecting the pivot point of this lever and the point of connection between the lever 83 and the spring 84, the tension of the spring will be exerted to return the lever 83 to its initial position, thus causing the contact 85 to bridge the two contacts 86 and 87 and re-establish the circuit of the solenoid. The above cycle of events is repeated in rapid succession, thus causing the annular gear 17 to rotate comparatively slowly but continuously.

In the modified form of my invention illustrated in Figure 8, I have replaced the motors of the two preceding embodiments by an electric motor 90 of the rotary type, the shaft 91 of which is connected with a shaft 92 journaled in bearings 93 and 94 projecting outwardly from the base plate 10 by means of the bevel gears 95 and 96. In place of a ratchet wheel in this embodiment of my invention, I provide an annular worm wheel 97 which is driven by the worm 98 formed on the shaft 92. This provides means for continuously rotating the annular gear 97 in one direction. Otherwise, this construction is similar to that shown in the remaining figures of the drawings.

While I have illustrated and described the details of construction of certain preferred embodiments of my invention, it is to be clearly understood that my invention is not limited to these details, but is capable of other adaptations and modifications within the scope of the appended claims.

Having thus described my invention, what I claim is new and desire to secure by Letters Patent of the United States is:

1. Operating means for a windshield cleaner comprising a base plate, a boss projecting from said base plate, said boss and base plate having a bore extending therethrough, a shaft journaled in said bore, a crank disk secured to the inner end of said shaft, a pin extending through said crank disk and into said boss, said boss being provided with two spaced openings for alternately receiving the end of said pin, a leaf spring having one end secured to said disc and the other end projecting outside the periphery of said crank disk, said pin being secured to said leaf spring intermediate the ends of said leaf spring, an eccentric pin carried by said crank disk, an annular gear journaled concentric with said shaft, a pin extending from one face of said gear, a tension spring connecting said last named pin and said eccentric pin, means for rotating said annular gear, and means carried by said annular gear for lifting the projecting end of said leaf spring when said tension spring is tensioned.

2. Operating means for a windshield cleaner comprising a base plate, a boss projecting from said base plate, said boss and base plate having a bore extending therethrough, a shaft journaled in said bore, a crank disk secured to the inner end of said shaft, a pin extending through said crank disk and into said boss, said boss being provided with two spaced openings for alternately receiving the end of said pin, a leaf spring having one end secured to said disc and the other end projecting outside the periphery of said crank disk, said pin being secured to said leaf spring, an eccentric pin carried by said crank disk, an annular gear journaled concentric with said shaft, a pin extending from one face of said gear, a tension spring connecting said last named pin and said eccentric pin, means for rotating said annular gear, and means carried by said annular gear for lifting the projecting end of said leaf spring when said tension spring is tensioned.

3. Operating means for a windshield cleaner comprising a base plate, said base plate having a bore extending therethrough, a shaft journaled in said bore, a crank disk secured to the inner end of said shaft, a pin extending through said crank disk and into said base plate, said base plate being provided with two spaced openings for alternately receiving the end of said pin, a leaf spring having one end secured to said disc and the other end projecting outside the periphery of said crank disk, said pin being secured to said leaf spring, an eccentric pin carried by said crank disk, an annular gear journaled concentric with said shaft, a pin extending from one face of said gear, a tension spring connecting said last named pin and said eccentric pin, means for rotating said annular gear, and means carried by said annular gear for lifting the projecting end of said leaf spring when said tension spring is tensioned.

4. Operating means for a windshield cleaner comprising a base plate, a shaft journaled in said plate, an eccentric pin carried by one end of said shaft, a gear journaled concentric with said shaft, a pin carried by said gear, a tension spring connecting said last named pin and said eccentric pin, a motor carried by said base plate for rotating said annular gear, and means for alternately holding said shaft against the tension of said spring and permitting it to rotate under the tension of said spring, said last named means being controlled by said annular gear.

5. Operating means for a windshield cleaner comprising a base plate, a shaft journaled in said plate, an eccentric pin carried by one end of said shaft, a gear journaled concentric with said shaft, a pin carried by said gear, a tension spring connecting said last named pin and said eccentric pin, a motor for rotating said annular gear, and means for alternately holding said shaft against the tension of said spring, and permitting it to rotate under the tension of said spring.

6. In operating means for a windshield cleaner, a rotatable element, a second rotatable element, resilient means joining said elements and adapted to be positioned to rotate the second element in alternate directions, a motor arranged to rotate said first mentioned element to tension said resilient means, means for preventing rotation of said second element, and means carried by said first element for releasing said holding means.

7. In operating means for a windshield cleaner, a rotatable driving disc, a rotatable driven disc, resilient means joining said discs and adapted to be successively positioned to rotate the second element in alternate directions, a motor for actuating said driving disc to place said resilient means and tension the same, means for holding said driven disc against rotation during the placing and tensioning of the resilient means, and means for releasing said holding means.

8. In operating means for a windshield cleaner, a rotatable driving disc, a rotatable driven disc concentric therewith, resilient means joining said discs off center and movable under tension across center to rotate the driven disc, a motor for rotating said driving disc to place said resilient means under tension and move it across center, means for holding said driven disc against rotation, and means carried by said driving disc for releasing said holding means to permit said driven disc to be rotated alternately in opposite directions by said resilient means.

9. In operating means for a windshield cleaner, a rotatable driving disc, a rotatable driven disc mounted concentric therewith, resilient means joining said discs and adapted to be placed under tension in two positions for effecting reverse rotation of the driven disc, a motor for rotating said driving disc to place said resilient means under tension, holding means for preventing rotation of said driven disc, and a pair of cams formed on said driving disc for releasing said tensioned resilient means alternately from its two positions.

10. Operating means for a windshield cleaner comprising an oscillatory member, a driving member concentric with and rotatable about the first member, a spring connected at one end eccentrically to the first member and at its opposite end to the driving member beyond the periphery of said first member whereby upon relative rotary movement between the members the spring will move across the axis of rotation and be tensioned as it approaches the axis, said spring acting successively to expend the stored-up energy first before the spring crosses the axis of rotation and then again after the spring crosses said axis thereby to impart an oscillatory movement to the first member, and means for permitting said spring to so act successively.

11. In operating means for a windshield cleaner, a pair of members rotatable about a common axis, means for restricting the movement of one member to a part of a circle, a coiled spring connecting the two members at eccentric points on each whereby relative rotary movement of the members will position the spring and store up energy therein to be subsequently expended in effecting a movement of the restricted member first in one direction and then in the opposite direction, means for rotating the other of said rotatable members in one direction only, and means cooperating with the restricting means for arresting movement of the restricted member until the spring has been properly positioned to function.

12. In operating means for a windshield cleaner, a driving member, a driven oscillatable member, a spring connecting the driving member to a point eccentric on the driven member, said driven member moving the spring from one side of the axis of the driven member to the opposite side thereof and tensioning the spring by and during such movement whereby said spring may operate said driven member before and after crossing said axis, means for releasably holding the driven member against movement while the spring is being positioned and tensioned, and means under the control of the driving member for rendering the holding means inoperative successively both before and after the spring crosses the aforesaid axis to permit of the spring moving the driven member in opposite directions.

13. In operating means for a windshield cleaner, an oscillatable member, a latch for securing the same at each limit of its path of movement, a gear member rotatable about the axis of said first member and operable to periodically render the latch inoperative, a spring disposed at one side of the gear and connected at one end eccentrically to the gear and at its opposite end to the oscillatable member, said gear acting to tension the spring and move it across the pivotal axis of said oscillatable member while the latter is latched, and then to unlatch the same whereby the tensioned spring will effect a swinging of the oscillatable member, and a motor for rotating the gear.

14. In operating means for a windshield cleaner, an oscillatory member, a second member rotatable about the axis of the first member, a spring connecting an eccentric point on one member to an eccentric point on the other member and movable across the axis of rotation upon relative rotary movement between said first and second members, said spring being tensioned by and during such movement across the axis, means for rotating the second member to tension and position the spring, means for holding the first member against movement at one limit of its travel while the spring is being tensioned, and means for releasing the first member during the tensioning of the spring whereby the latter will move the first member to its opposite limit of movement, said second member following up the first member and acting to move the spring under tension across the axis of rotation, after the first member has reached said opposite limit, to effect a return oscillation or movement of the aforesaid first member.

In witness whereof, I hereunto subscribe my name this 3d day of February, 1922.

EARL F. PIERCE